United States Patent [19]
Berger et al.

[11] Patent Number: 5,181,214
[45] Date of Patent: Jan. 19, 1993

[54] TEMPERATURE STABLE SOLID-STATE LASER PACKAGE

[75] Inventors: Josef Berger, Santa Clara; Doron Mick, Sunnyvale; Joseph Kleefeld, Palo Alto, all of Calif.

[73] Assignee: Harmonic Lightwaves, Inc., Santa Clara, Calif.

[21] Appl. No.: 793,582

[22] Filed: Nov. 18, 1991

[51] Int. Cl.⁵ .............................. H01S 3/04
[52] U.S. Cl. ........................ 372/34; 372/36; 372/71; 372/75; 372/21; 372/22
[58] Field of Search ............ 372/34, 36, 71, 75, 372/21, 22, 39

[56] References Cited

U.S. PATENT DOCUMENTS

| | | | |
|---|---|---|---|
| 4,749,842 | 6/1988 | Kane et al. | 372/36 |
| 4,797,896 | 1/1989 | Kane | 372/94 |
| 4,802,178 | 1/1989 | Ury | 372/36 |
| 4,809,291 | 2/1989 | Byer et al. | 372/75 |
| 4,856,871 | 8/1989 | Van Sant | 350/253 |
| 4,933,947 | 6/1990 | Anthen et al. | 372/34 |
| 4,948,221 | 8/1990 | Yates | 350/96.2 |
| 4,993,801 | 2/1991 | Sarraf | 350/96.2 |
| 5,113,404 | 5/1992 | Gaebe et al. | 372/34 |

FOREIGN PATENT DOCUMENTS

| | | | |
|---|---|---|---|
| 0103785 | 8/1980 | Japan | 372/36 |
| 0197186 | 11/1984 | Japan | 372/36 |
| 0318275 | 12/1989 | Japan | 372/36 |
| 0006082 | 1/1991 | Japan | 372/34 |

Primary Examiner—Georgia Y. Epps
Attorney, Agent, or Firm—Schneck & McHugh

[57] ABSTRACT

A laser-diode or laser diode array end-pumped solid-state laser package for optical communications and the like mounted on a common thermally conductive, low thermal expansion base that is temperature stabilized with a thermo-electric cooler. The laser package includes a heat sink, a thermo-electric cooler mounted on the heat sink, a base having a base plate portion mounted on the thermo-electric cooler and a block portion mounted on the base plate portion and optical elements mounted on the base plate and block. The laser active medium and collimating and focusing lenses are mounted with their optically axes collinear in a v-groove formed in a top surface of the block. A laser diode pump is mounted to the base plate and supported so that its laser emission is aligned with the length of the groove. One cavity mirror is a curved reflective coating on an end of the active medium which is transparent to the laser diode pump light and reflective of the active medium generated laser light, while a second cavity mirror is a planar mirror mounted on the base plate. The optical system is aligned at an operating temperature at which the laser diode light's wavelength matches an absorbption band of the active medium. A thermistor on the base plate measures the temperature so that a processor can adjust the electric current applied to the thermo-electric cooler to maintain the base plate temperature at the operating temperature even in extreme ambient temperatures.

32 Claims, 2 Drawing Sheets

TEMPERATURE STABLE SOLID-STATE LASER PACKAGE

DESCRIPTION

Technical Field

The present invention relates to semiconductor-diode-laser-pumped solid-state lasers, and laser-based optical communications packages employing such lasers, and in particular to laser systems characterized by temperature control to stabilize the laser as operating conditions change.

Background Art

Optical communications systems require lasers and other optical elements in the system be placed in the field where, even though buried in underground conduits and the like, they may be exposed to extreme environmental conditions. For example, the system's optical elements may be exposed to ambient temperatures ranging from −30° C. to about 50° C. Laser packages are typically quite sensitive to temperature. Many systems employ modulated semiconductor laser diodes which, if not temperature stabilized, will shift wavelength as the diode material expands or contracts. One common solution is to mount the diode onto a thermo-electric cooler and a dual-purpose heat sink/chip carrier, where the amount of waste heat generated by the laser diode that is removed by the heat sink depends on the amount of current applied to the thermo-electric cooler. Thermo-electrically cooled laser diode packages are commercially available. The optical power output of laser diodes is generally very low, the number of laser transmitter and relay stations in a laser-diode-based communications system is relatively high.

For higher optical power outputs, solid-state lasers would be a desirable alternative, requiring fewer transmitter and relay stations. Solid-state lasers built for laboratory use include a thermo-electrically cooled laser diode for optically pumping the solid-state active medium, one or more lenses are for focusing the pump laser beam into the mode volume of the active medium, the active medium itself and cavity mirrors, one of which might be a reflective coating on an end of the active medium. The laser diode is temperature stabilized so that the pump light's wavelength matches an absorption band of the active medium. The active medium is generally also cooled to remove excess waste heat that might damage the material. U.S. Pat. No. 4,809,291 to Byer et al. describes one such system. It also includes a separate thermo-electric cooler on a frequency doubler crystal. For optical communications purposes, such a laser would also need a means for modulating the light output to generate the optical signal. One technique uses an external optical modulator based on the principle of Mach-Zender interferometry or uses a semiconductor quantum-well light absorbing modulator. For analog communication, such as for amplitude modulation, vestigial side band (AM-VSB) television channels in CATV distribution on optical fibers, the laser has to be well isolated from fiber back-scattered light and from the connector's back reflections. An optical isolator with better than 30 dB isolation has to be incorporated into the laser package design. Such an isolator is also quite temperature sensitive and would need to be temperature stabilized. Unfortunately, while such solid-state systems are useful under laboratory conditions or within single buildings, they do not meet the demanding requirements of field use despite temperature control of individual elements, leaving diode-laser-based systems the most practical at the present time.

It is an object to provide a solid-state laser package, especially for use in optical communications, operable in ambient temperatures ranging from −30° C. to 50° C., and storable between −40° C. and 70° C

Disclosure of the Invention

The above object has been met with a solid-state laser package in which all of the optical elements of the package are mounted on a common thermally conductive, low thermal expansion base that is temperature stabilized as a single unit with a common thermo-electric cooler. It has been discovered that, in addition to the need for individual temperature stable elements, such as the laser diode, active medium and optical isolator, the relative alignment of the elements in the system is also particularly sensitive to temperature.

In the laser package of the present invention, a particular operating temperature is specified as that temperature at which the laser diode emits lightwaves that match an absorption band of the active medium being pumped by that diode, then all optical elements in the system, including the laser diode, collimating and focusing lens, the active medium, the cavity mirrors, the intra-cavity Brewster window, an optical isolator, any modulating means, and a coupling fiber are mounted on the base and initially aligned at that operating temperature. The package includes a thermistor for measuring the temperature of the base and a processor controlling the thermo-electric cooler in response to the actual base temperature relative to the desired operating temperature. Finer base temperature adjustments can be made by monitoring the light intensity of the solid-state laser output. In this way all of the optical elements mounted on the base maintain their relative alignment, because the base is stabilized at the operating temperature.

BEST MODE OF CARRYING OUT THE INVENTION

Figure 1:
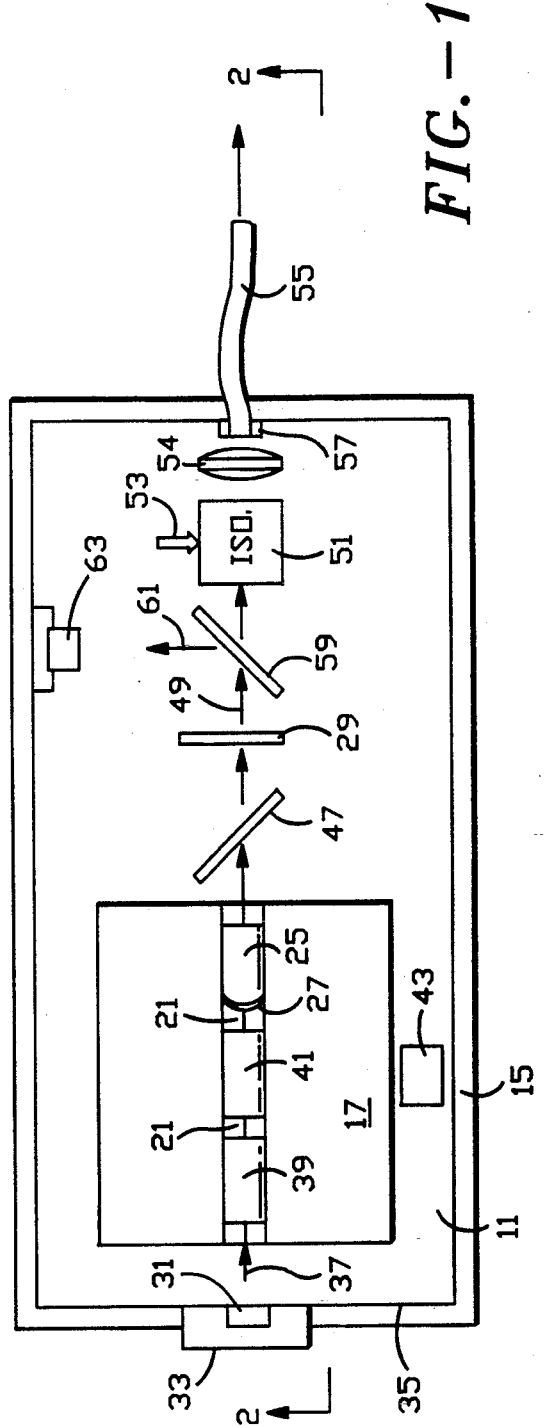
FIG. 1 is a top plan view of a temperature stabilized laser package of the present invention.
Figure 2:
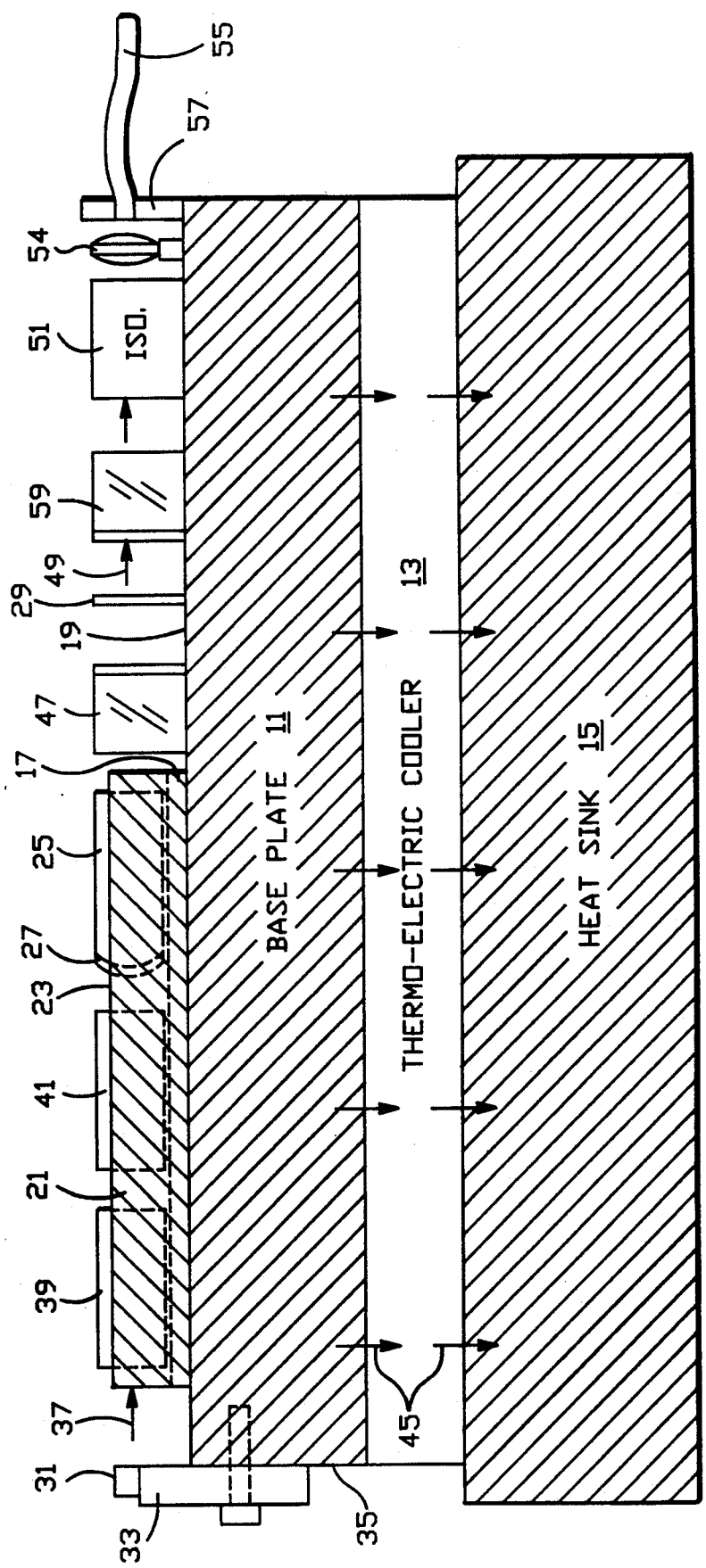
FIG. 2 is a side sectional view of the laser package of the present invention taken along the line 2—2 in FIG. 1.

With reference to FIGS. 1 and 2, a solid-state laser package of the present invention mounts all of its optical elements to a common, temperature stabilized, base plate 11. This base plate 11 is made up of a thermally conductive, low thermal expansion material, such as a copper-tungsten alloy. The base plate 11 is mounted on a thermo-electric cooler 13, which in turn is mounted on a heat sink. The thermo-electric cooler 13 controls the rate of heat flow between the base plate 11 and heat sink 15 in order to maintain the temperature of the base plate 11 at a constant, predetermined operating temperature. Typically, a block 17 of the same material as the base plate 11 is mounted onto a substantially planar, top major surface 19 of the base plate 11. The block 17 has a lengthwise v-groove 21 formed in its top surface 23. The v-groove makes alignment of certain key optical elements of the laser package easier. The base plate 11 and block 17 could be separate pieces bonded to one another for ease in manufacturing, or can be a single unitary piece.

A solid-state laser material active medium 25 is mounted in the v-groove 21. Typically, the medium 25 is in the form of a cylindrical rod or a slab with a square cross-section matching the shape of the v-groove. The material is a single-crystal or amorphous solid matrix in which the active lasing species, such as $Nd^{3+}$, $Cr^{3+}$ or $Er^{3+}$ ions or color centers, are uniformly distributed. Nd:YAG, Nd:YLF, Nd:YALO, Nd:Glass, LNP, alexandrite and other solid media are typical. The laser cavity is generally formed by two mirrors in an unfolded configuration. A first cavity mirror 27 is a curved mirror positioned in the v-groove 21 behind the active medium 25. Preferably, this first mirror is a reflective coating formed on a spherical convex end surface of the rod or slab of active medium material 25. The second cavity mirror 29 is a planar mirror mounted on the base plate 11 in front of the active medium 25. The cavity configuration is preferably confocal, with the lengthwise position of the planar second cavity mirror 29 being in the focal plane of the curved first cavity mirror 27. However, other cavity configurations are also possible. The side-to-side and up-and-down positioning of the planar cavity mirror 29 is not critical, it being necessary only to place it in the path of light emitted from the active medium 25 along the direction of the lengthwise v-groove 21. The orientation of the planar second cavity mirror 29 should be as close to perpendicular to the direction of the first mirror radius of curvature. The need for extremely precise orientation is reduced by the curvature of first cavity mirror 27.

A high power laser diode 31 or laser diode array is mounted on a chip carrier 33, and both diode 31 and carrier 33 are mounted to a back edge 35 of base plate 11 with the laser diode 31 being supported by the carrier 33 above the top planar surface 19 of the base plate 11 so as to be level with the top of the v-groove 21 in block 17. The laser diode 31 produces a first laser beam 37 that is directed along the v-groove 21 toward the active medium 25 so as to optically pump the active medium 25. The laser diode 31 is thermally tunable to match the wavelength of the pump laser light 37 with an absorption band of the active medium 25. A typical laser diode wavelength for pumping Nd:YAG rods is about 0.808 μm. The particular temperature of the base plate 11 that causes the diode 31 to emit light in the active medium's laser absorption band is specified as the operating temperature at which all other optical elements in the package are aligned. A typical operating temperature is between 15° C. and 25° C.

A pair of lenses 39 and 41 are placed in the v-groove 21 between the laser diode 31 and the first cavity mirror coating 27 on active medium 25. Lenses 39 and 41 are typically graded-index lenses. First lens 39 is a collimating lens receiving the diverging diode laser light 37 on its input end and producing a collimated beam on its output end. The longitudinal position of first lens 39 along the v-groove is made such that the spacing between the laser diode 31 and first lens 39 produce maximum collimation of the pump light 37. Because the divergence of the diode laser light 37 differs in the lateral and transverse dimensions, the focal length of the first lens 39 may vary in the lateral and transverse directions. Alternatively, the relative divergences may be partially preadjusted at the laser output face with a cylindrical lens. The laser diode 31 is adjusted in its position from side-to-side and up-and-down so that its light output 37 is incident along the optical axis of the lens 39, and so that the collimated output from the collimating lens 39 is directed along the groove 21. Second lens 41 is a focusing lens receiving the collimated light from first lens 39 on its input end and producing a focused beam on its output end directed through the first cavity mirror 27 into the mode volume in the active medium 25 of the resonant cavity. The cavity mirror 27 is transparent to the wavelength (about 0.8 μm for Nd:YAG) lasers of the pump light from the laser diode 31, but highly reflective at the wavelength (about 1.319 μm) of the laser light generated by the active medium 25 (such as Nd:YAG). The focal length of the second lens 41 and the relative spacing between the second lens 41 and the active medium 25 are selected to maximize optical pumping of the mode volume of the desired laser mode, as is well known in the art. Side-to-side and up-and-down positioning of the focusing lens 41 and active medium 25 are made easy by the v-groove 21 into which they are mounted so that the optical axes of the first lens 39, second lens 41 and active medium 25 are all collinear.

A thermistor 43 is placed on the base plate 11 near the block 17 to measure the temperature of the base plate 11. Since the optical elements 31, 39, 41, 27, 25, 29, etc. mounted to the base plate 11 and block 17 are aligned at the operating temperature, in which diode laser light 37 has a wavelength that matches an absorption band of the active medium 25, any change in the ambient temperature in the environment of laser package could lead to a change in temperature of the base plate 11 and block, which could cause some expansion or contraction of the base plate and block material and perturb the initial alignment. It could also shift the wavelength of diode output 37. Accordingly, the temperature of the base plate 11 and block 17 is stabilized at the operating temperature by continually measuring the base plate temperature with the thermistor 43 and then, responsive to this measurement, adjusting the electric current applied to the thermo-electric cooler 13. When the temperature measured by the thermistor 43 exceeds the initially specified operating temperature, the electric current to the thermo-electric cooler 13 is increased to increase the rate of heat flow 45 from the base plate 11 to the heat sink 15, thereby cooling the base plate 11 back to the operating temperature. When the temperature measured by the thermistor 43 is lower than the operating temperature, the electric current to the thermo-electric cooler 13 is decreased in order to decrease the rate of heat flow 45 from the base plate 11 to the heat sink 15, thereby letting the heat generated in the active medium 25 raise the temperature of the block 17 and base plate 11 back to the operating temperature. In extremely cold ambient environments, the current applied to the thermoelectric cooler 13 can be reversed, if necessary, to cause heat to be pumped in the reverse direction from the heat sink 15 to the base plate 11. In this situation, the thermo-electric element 13 effectively acts as a heater.

When used for optical communications, the laser package may also contain a means for modulating the intensity of the laser output beam emitted through planar second cavity mirror 29 in response to an input signal. In FIGS. 1 and 2, a Brewster-angle window 47 is mounted on the base plate 11 between active medium 25 and second mirror 29, that is, within the optical cavity. This window 47 is a transparent biplanar plate oriented at a Brewster angle $\Theta = \arctan(n)$ with respect to the length of the v-groove 21 so as to linearly polarize the laser beam. Here "n" is the refractive index of the window material. Though in principle Brewster-angle windows or another polarizing element could be placed in the path of the laser beam 49 outside of the optical cavity, such a position would effectively throw out about half of the laser energy corresponding to the rejected polarization component. Placing the Brewster-angle window 47 inside the cavity sets up a resonance condition for only one polarization component so the laser output beam 49 is polarized without significant loss of optical energy. The polarized light beam 49 is directed through an optical isolator 51 mounted on the base plate 11. The isolator 51 typically includes a Faraday rotation element inside a magnet, and two polarizers positioned before and after the Faraday rotator and mounted with their polarization planes oriented at 45° with respect to each other, in order to transmit the light in the forward direction and block the light in the backward direction. The amount of isolation should be better than 30 dB at the operating temperature. An optional optical modulator following the isolator will produce an intensity modulated optical signal corresponding to the electrical input signal 53. The laser package is typically coupled to an optical fiber waveguide 55 in communications applications. The package can include a mount 57 for the optical fiber 55 on the base plate 11 adjacent to the isolator 51. The end of the optical fiber 55 is maintained in optical alignment with the modulated laser output beam from the isolator 51 by the mount 57. For example, the mount may include piezo-electric elements to adjust the side-to-side and up-and-down position of the optical fiber 55. A focusing lens 54 may be mounted between the isolator 51 (or the isolator and modulator) and the optical fiber 55 to couple the light beam into the fiber's core. The fiber 55 could be a polarization-maintaining fiber aligned to receive the polarized light beam from the isolator 51 (or the isolator and modulator).

The laser package can also include a beamsplitter 59 mounted on the base plate 11 and positioned in the path of the laser output beam 49. Beamsplitter 59 is oriented at an angle other than perpendicular to the lengthwise direction of the groove 21 so as to laterally reflect a portion 61 of the laser beam 49. Typically, beamsplitter 59 is at about a 45° angle relative to the lengthwise direction and reflects not more than 5% of the laser beam output energy. A detector 63 is also mounted on the base plate 11 in the path of the reflected beam portion 61 for measuring the light intensity of that beam portion 61. This measurement can be used to make fine adjustments to the temperature of the base plate 11 and block 17 in order to optimize the laser diode light absorption for maximum light intensity from the solid state laser output.

Figure 3:
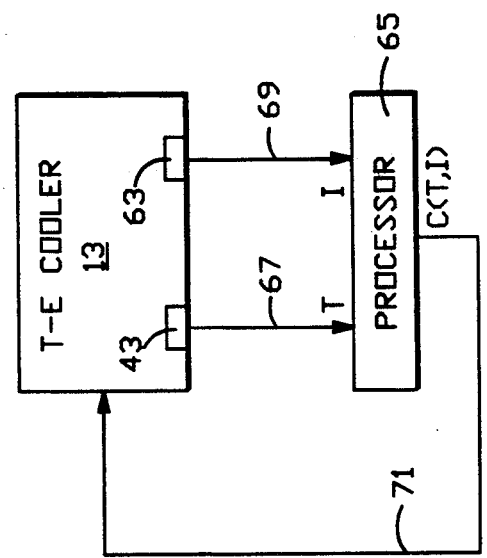
FIG. 3 is a schematic diagram of the temperature stabilization control loop of the laser package of FIGS. 1 and 2.

In FIG. 3, the temperature stabilizing control system of the laser package is seen to include the thermo-electric cooler 13 that controls the amount of heat flow between the base plate and the heat sink of the package, the thermistor 43 that measures the base plate temperature T, the detector 63 that measures the light intensity I of the solid state laser beam output and thus indicates the fine thermal tuning of the laser diode spectrum, and a processor 65 connected via conductive lines 67 and 69 to the thermistor 43 and detector 63 to receive electrical signals representative of their measurements, T and I. The processor 65 in turn communicates with thermo-electric cooler 13 via a conductive line 71 to adjust the electric current C (T, I) applied to thermo-electric cooler 13. The processor 65 attempts to maintain the base plate temperature T at the operating temperature for maximum output light intensity I regardless of the ambient temperature of the environment around the laser package. A coarse adjustment of the temperature T over a broad range brings and maintains the temperature T measured by the thermistor 43 near the operating temperature. Then a fine adjustment of the temperature T over a narrower range precisely adjusts the temperature T to that point at which the beam intensity I measured by the detector 63 is at a maximum. This is close to the temperature at which the optical elements in the laser package were initially aligned. Placing all of the optical elements of the laser package on a single base stabilized by a single thermo-electric cooler 13 considerably expands the range of ambient temperatures in which the laser package will operate. Typically, an operating range of from $-30°$ C. to 50° C. is achieved, and a storage temperature ranges from $-40°$ C. to 70° C. is possible, without any noticeable degradation.

We claim:

1. A solid-state laser package comprising
   a heat sink,
   a thermo-electric cooler mounted on said heat sink,
   a thermally conductive, low thermal expansion, base mounted on said thermo-electric cooler,
   means for applying an electric current to said thermo-electric cooler so as to cause heat flow between said base and said heat sink at a rate determined by said electric current,
   a solid material laser active medium mounted on said base,
   reflective means mounted on said base for defining an optical resonant cavity, said active medium positioned within said cavity,
   a laser diode means mounted to said base for producing a first laser beam with a first wavelength thermally tuned to match an absorption band of said active medium at an operating temperature,
   means for focusing and directing said first laser beam into an end of said active medium, said reflective means being transparent to said first wavelength to admit said first laser beam into said cavity containing said active medium,
   means for measuring a temperature of said laser to which said active medium, said reflective means, said laser diode means and said focusing and directing means are mounted, and
   temperature stabilizing means, responsive to said temperature measuring means, for adjusting said electric current applied to said thermo-electric cooler to maintain said temperature of said base at said operating temperature, said active medium, said reflective means, said laser diode means and said focusing and directing means being optically aligned at said operating temperature to provide a laser beam output from said cavity, said temperature stabilizing means thereby maintaining said optical alignment.

2. The laser package of claim 1 further comprising a Brewster-angle window mounted on said base in said cavity.

3. The laser package of claim 2 further comprising an optical isolator mounted on said base in optical alignment with said laser beam output, said isolator being maintained at said operating temperature by said base mounted on said thermo-electric cooler.

4. The laser package of claim 3 further comprising
a lens for focusing said laser beam output received from said optical isolation into an optical fiber, and
means for mounting an end of said optical fiber to said base in optical alignment with said laser beam output to receive said focused laser beam output from said lens.

5. The laser package of claim 1 further comprising a lens focusing said laser beam output into an optical fiber.

6. The laser package of claim 5 further comprising means for mounting an end of an optical fiber to said base in optical alignment with said laser beam output to receive said laser beam output.

7. The laser package of claim 5 wherein said optical fiber is a single mode optical fiber.

8. The laser package of claim 5 wherein said optical fiber is a polarization maintaining fiber.

9. The laser package of claim 1 further comprising
a beamsplitter mounted on said base in optical alignment with said laser beam output for laterally reflecting a portion of said laser beam output onto an optical intensity measuring detector.

10. The laser package of claim 9 wherein said detector is mounted on said base in the path of said reflected beam portion for measuring a light intensity of said reflected beam portion, said temperature stabilizing means being responsive to both said temperature measuring means and said detector for finely adjusting said electric current applied to said thermo-electric cooler so as to maximize said light intensity.

11. The laser package of claim 1 wherein said focusing and directing means comprise a collimating lens and a focusing lens disposed in sequence in the light path between said laser diode means and said active medium.

12. The laser package of claim 1 wherein said focusing and directing means comprise a single lens disposed in the light path between said laser diode means and said active medium.

13. The laser package of claim 1 wherein said focusing and directing means have different vertical and horizontal focal lengths.

14. The laser package of claim 1 wherein said reflective means includes a curved mirror coating on an end of said active medium.

15. The laser package of claim 1 wherein said focusing and directing means and said active medium are disposed in a groove formed in said base, said laser diode means being aligned with said groove so that said first laser beam is directed along said groove to said active medium.

16. The laser package of claim 1 wherein said laser diode means comprises a single laser diode.

17. The laser package of claim 1 wherein said laser diode means comprises a laser diode array.

18. The laser package of claim 1 wherein said base comprises a first base plate portion mounted on said thermo-electric cooler with a substantially planar top major surface and a second block portion mounted on said top major surface of said first base plate portion, said second block portion having a groove formed in a top surface thereof, at least said active medium and said directing and focusing means being mounted in said groove, said laser diode means being mounted to said first base portion in alignment with said groove.

19. The laser package of claim 1 wherein said base is composed of a copper-tungsten alloy.

20. The laser package of claim 1 further comprising an optical modulator mounted on said base to modulate said laser beam output.

21. The laser package of claim 20 wherein an optical isolator is mounted on said base between said reflective means and said optical modulator, and wherein an optical fiber is mounted to said base in alignment with said modulated laser beam output to receive said modulated output.

22. A solid-state laser package comprising
a heat sink,
a thermo-electric cooler mounted on said heat sink,
a thermally conductive, low thermal expansion, base plate mounted on said thermo-electric cooler, said base plate having a substantially planar top major surface,
a thermally conductive, low thermal expansion, block on said top major surface of said base plate, said block having a groove formed in a top surface thereof,
a laser diode means mounted to said base plate in alignment with said groove for producing a first laser beam with a thermally tunable first wavelength, said first laser beam directed along said groove,
a solid material laser active medium mounted in said groove in said block in alignment with said first laser beam, said first wavelength of said first laser beam matching an absorption band of said active medium when said laser diode means is at a particular operating temperature,
at least one lens mounted in said groove between said laser diode means and said active medium for directing said first laser beam into said active medium through an end of said active medium, whereby said active medium generates light under lasing conditions with a second wavelength,
first and second cavity mirrors, a first mirror being a curved reflective coating on an end of said active medium in said groove between said at least one lens and said active medium, a second mirror being planar and mounted on said base plate perpendicular to the length of said groove with said active medium being between said first and second cavity mirrors,
a transparent biplanar plate mounted on said base plate between said active medium and said second cavity mirror and oriented at a Brewster angle with respect to the length of said groove,
an optical isolator mounted on said base plate in a path of a second solid state laser beam output emitted through said second cavity mirror,
means for measuring a temperature of said base plate, and
temperature stabilizing means, responsive to said temperature measuring means, for adjusting an electric current applied to said thermo-electric cooler to vary the rate of heat flow between said base plate and said heat sink so as to maintain said temperature of said base plate at said operating temperature, whereby an initial alignment of said laser diode means, at least one lens, active medium, cavity mirrors, transparent Brewster angle plate and optical isolator is maintained.

23. The laser package of claim 22 wherein said block and said base plate form a single unitary piece.

24. The laser package of claim 22 wherein said block is mounted onto said base plate.

25. The laser package of claim 22 wherein said laser diode means comprise a single laser diode.

26. The laser package of claim 22 wherein said laser diode means comprise a laser diode array.

27. The laser package of claim 22 further comprising a partially transparent biplanar plate mounted on said base plate between said second cavity mirror and said optical isolator and oriented to laterally deflect a portion of said second laser beam onto a light intensity monitoring detector.

28. The laser package of claim 23 further comprising a control circuit responsive to said detector for adjusting the temperature of said base plate so as to maintain said second solid state laser beam output monitored by said detector at a predetermined intensity level.

29. The laser package of claim 22 further comprising a light modulator mounted on said base plate in alignment with said second solid state laser beam output to modulate said output.

30. The laser package of claim 29 wherein said light modulator is positioned outside of the laser cavity defined by said cavity mirrors.

31. The laser package of claim 29 wherein said light modulator is positioned inside of the laser cavity defined by said cavity mirrors.

32. The laser package of claim 29 wherein said light modulator is positioned after said optical isolator.

* * * * *